United States Patent [19]
Bohlander et al.

[11] Patent Number: 4,457,449
[45] Date of Patent: Jul. 3, 1984

[54] PRESSURE TANK FOR HOT FLUIDS OR AGENTS

[75] Inventors: Friedhelm Bohlander; Heinich Rywalski, both of Essen, Fed. Rep. of Germany

[73] Assignee: Fried. Krupp Gesellschaft mit beschränkter Haftung, Essen, Fed. Rep. of Germany

[21] Appl. No.: 383,937

[22] Filed: Jun. 1, 1982

Related U.S. Application Data

[63] Continuation of Ser. No. 119,101, Feb. 6, 1980, abandoned.

[30] Foreign Application Priority Data

Feb. 14, 1979 [DE] Fed. Rep. of Germany ........ 2905593

[51] Int. Cl.³ .................... B65D 8/06; B65D 25/20
[52] U.S. Cl. .............................. 220/445; 220/3; 220/450; 220/452
[58] Field of Search ................ 220/3, 445, 451, 452, 220/450; 52/449, 224; 138/175; 376/294, 295, 296

[56] References Cited

U.S. PATENT DOCUMENTS

| | | | |
|---|---|---|---|
| 1,940,277 | 12/1933 | Stresau | 52/249 X |
| 2,955,415 | 10/1960 | Lons | 220/445 X |
| 2,959,318 | 11/1960 | Clark et al. | 220/445 X |
| 3,171,563 | 3/1965 | Bernd | 220/3 |
| 3,231,338 | 1/1966 | Andrus | 220/3 X |
| 3,361,284 | 1/1968 | Sotiri Luka et al. | 220/452 X |
| 3,424,239 | 1/1969 | Coudray | 52/224 X |
| 3,503,171 | 3/1970 | Frohly | 138/175 X |
| 3,595,728 | 7/1971 | Robson | 220/445 X |
| 3,895,146 | 7/1975 | Nishimaki | 220/445 X |
| 3,935,957 | 2/1976 | Hasegawa | 220/452 X |
| 4,015,742 | 4/1977 | Albrecht et al. | 220/3 X |
| 4,053,086 | 10/1977 | Daublesky | 220/3 |
| 4,087,017 | 5/1978 | Okamoto et al. | 220/452 X |

*Primary Examiner*—Allan N. Shoap
*Attorney, Agent, or Firm*—Becker & Becker, Inc.

[57] ABSTRACT

A pressure tank for hot fluids or agents, with the metallic wall thereof having interspaces and an inner layer with a plurality of layers placed therearound. The interspaces are arranged behind, that is, outwardly of, the inner layer, or between two layers. At least in the hottest region of the tank, the interspaces occupy at least 1/15, preferably 1/10 to ½, of the volume of the entire wall, and are filled with a thermally insulating solid medium.

3 Claims, 3 Drawing Figures

PRESSURE TANK FOR HOT FLUIDS OR AGENTS

This is a continuation of application Ser. No. 119,101 - Bohlander et al. filed Feb. 6, 1980, now abandoned.

The present invention relates to a pressure tank for hot fluids or agents. The metallic wall of the pressure tank has interspaces which are filled with a thermally insulating medium, and comprises an inner layer and a plurality of layers placed around this inner layer.

Pressure tanks for hot fluids have up to now often been provided, on the inner side of the tank wall, with a masonry lining of insulating brick, as a result of which the wall temperature can be reduced to such an extent that no high-temperature structural steel has to be used. With these so-called cold operating tanks, however, a frequent restoring or repair of the masonry lining is necessary, so that it is difficult to maintain a continuous process within the tank.

Other tanks for hot fluids are known, according to which, to cool their wall with suitable components, the still cold process gas must first be conveyed along the inner wall of the tank. However, the thus conveyed gas heats up relatively quickly, so that the cooling effect is correspondingly reduced. In addition, this cooling method is not usable for all, but rather only for certain, processes of reactions.

It is already known to provide the multilayer walls of a coil pressure tank with helical hollow spaces of small volume which are arranged directly behind, i.e., outwardly of, the inner layer. It was proposed to use these hollow spaces as heating or cooling channels. Such a cooling requires a large expense for apparatus, and has the inherent danger of damage to the tank as a result of thermal stresses which occur.

It is therefore an object of the present invention to provide a tank of the aforementioned general type which does not have the aforementioned drawbacks of the heretofore known pressure tanks, and, while adequately reducing the temperature, is simple in construction and can be produced economically.

This object, and other objects and advantages of the present invention, will appear more clearly from the following specification in connection with the accompanying drawings, in which.

Figure 1:
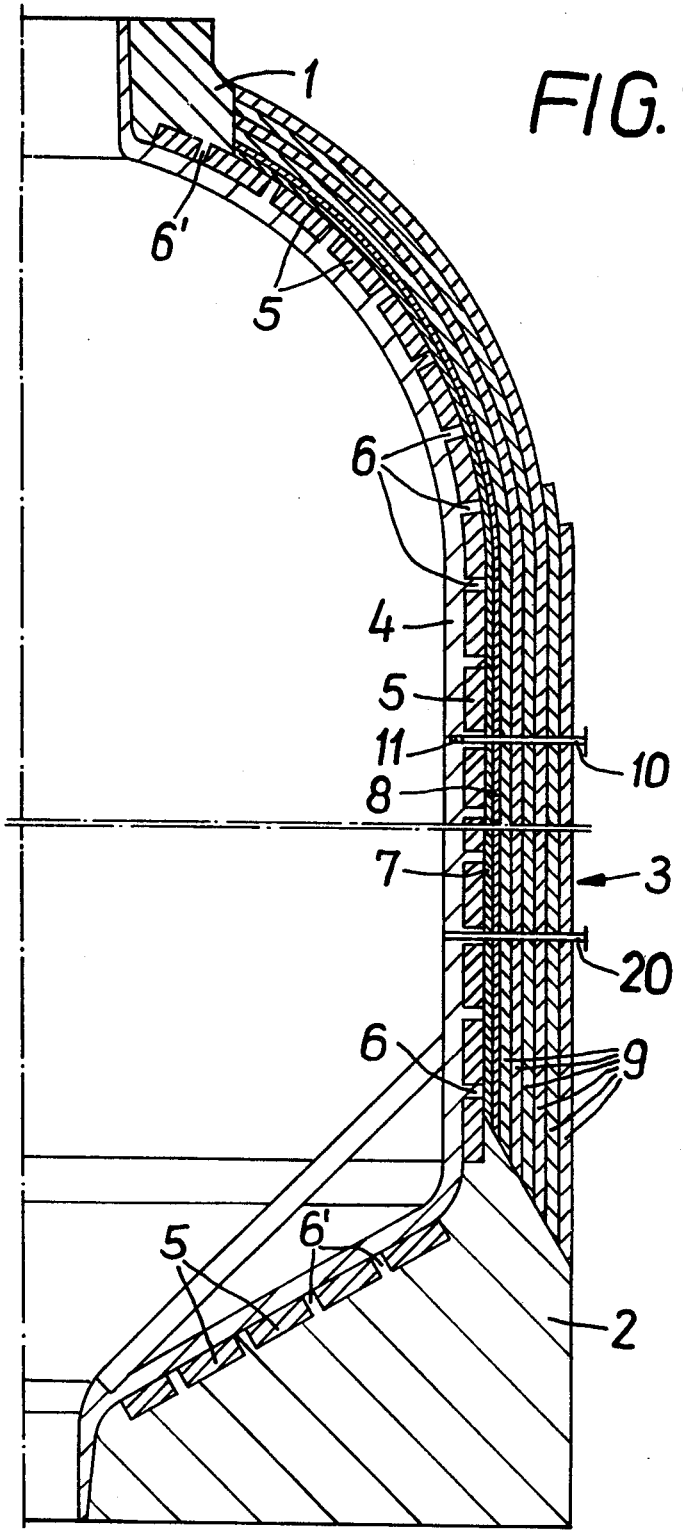
FIG. 1 is a longitudinal section through half of a pressure tank according to the present invention.

The pressure tank of the present invention is characterized primarily in that the interspaces or intermediate spaces or chambers, which are arranged outwardly of the inner layer or between two layers, occupy, at least in the hottest region of the tank, at least 1/15, preferably at least 1/10 to 1/2, of the volume of the entire wall configuration, and are filled with a thermally insulating solid medium.

With the present invention, it is possible to reduce the operating temperature, which prevails within the tank, in the wall of the pressure tank. The temperature is reduced by the thermal insulation of the interspaces to such an extent that no particular high-temperature material has to be used for the supporting layers. The pressure tank of the present invention also does away with the need for using additional layers which reinforce the wall and which must be used with so-called hot operating tanks to compensate or balance reduction of the strength values resulting from the high temperatures.

The present invention also eliminates danger of implosion which is present with tanks provided with masonry linings. Furthermore, by shifting the thermally insulating layer more toward the outside, a falling below the condensation temperature on the inside of the wall, and the corrosion associated therewith, are avoided.

The pressure tank of the present invention is particularly suitable for exothermic processes which are carried out in the temperature range of between 400° and 500° C., such as hydrogenation of carbon and hydrocracking. The phrase "hottest portion" of the container refers to that portion or region in which at least 75% of the operating temperature is achieved. Of course, there can also be more than one hottest portion.

Respective size and positioning of the interspaces is determined by the required temperature reduction in conformity with the temperatures prevailing at particular points. For certain applications, it may also be advantageous to place the interspaces further toward the outside, so that they are arranged between the supporting layers rather than being arranged directly adjacent the inner layer. According to one embodiment of the present invention, the interspaces occupy at least $\frac{1}{2}$, preferably 17/20 to 19/20, of their circumferential extent. Pressure transmitting webs or crosspieces may be arranged in the region of the interspaces and interrupt said circumferential extent. A non-supporting, sealed separating layer may adjoin the interspaces on the outer side thereof.

With the pressure tanks of the present invention, it is not necessary to use a particular material having good high-temperature characteristics for the supporting layers; rather, the fine-grained structural steel normally used for this purpose is sufficient.

Practically all thermal insulating materials which have the respectively required thermal resistance can be used as solid medium for filling the interspaces. Examples of such solid media include fire brick, asbestos, cinder, pumice, and kieselguhr, separately or close together as wool, mortar, or formed pieces. Particularly advantageous is rock wool. Concrete too, especially fireproof concrete, is important, particularly for embodiments not having supporting pressure-transmitting webs or crosspieces.

Referring now to the drawings in detail, the specific embodiment of FIG. 1 pertains to a hydrogenation reactor which is designed to operate at a temperature of 475° C. and a pressure of 325 bar. The top 1 and the base 2 of the tank are forgings having a central opening. The multi-layered wall 3 extends between these two forgings. An inner layer 4 of pressure-hydrogen resistant chrome-molybdenum-steel covers the entire inner wall of the tank. Interspaces 5 adjoin the outer side of this inner layer 4 and are formed in such a way that webs or crosspieces 6 and 6' are connected to the inner layer 4. The webs 6, which are arranged in the multi-layer region of the tank, are produced in such a way that the interspaces 5 are made from the inner layer body. On the other hand, in the region of the top 1 and the base 2, the interspaces 5 are made from the pertaining forgings, so that the webs 6' remain stationary.

A sealed or closed off separating layer 7 of molybdenum steel adjoins the webs 6 and the interspaces 5, which are filled with fireproof material. The separating layer 7 is surrounded by an intermediate layer 8 which comprises aperture plates and serves for the degasification and also as a backing strip. To this intermediate layer 8 are connected outwardly stressed layers 9, each of which has substantially the same thickness. The two outer layers 9 essentially surround only the cylindrical portion of the pressure tank. The layers 9 comprise standard fine-grained structural steel, and are provided with known recesses (not shown) which make it possible to withdraw gases which may have collected in the intermediate layer 8.

Thermocouple elements 11, which are placed through openings 10 in the wall 3, serve as devices for measuring the temperature in the inner layer 4 near the inner wall thereof. The bores or openings 10 pass through the webs 6.

Figure 2:
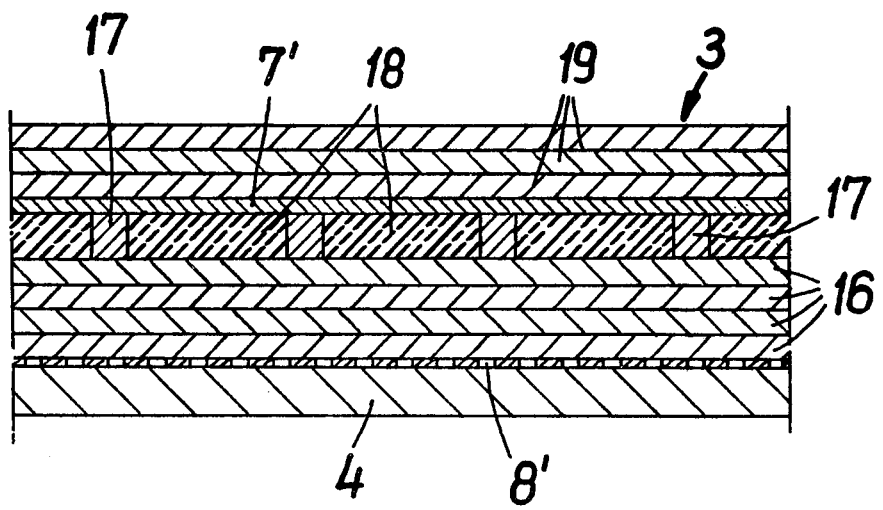
FIGS. 2 and 3 are enlarged longitudinal sections of yet other embodiments of the tank wall.

FIG. 2 shows a wall of another embodiment of the pressure tank of the present invention. In contrast to the previous embodiments, with this embodiment the interspaces have been shifted further toward the outside. An intermediate layer 8' in the form of a grating is directly connected to the inner layer 4. Four supporting layers 16 are successively placed about the intermediate layer 8'. The outer layer 16 is adjoined by interspaces 18, which are interrupted or separated by members or blocks 17 which serve as spacers and have a quadratic cross section and a rectangular longitudinal section. The outer dimensions of the interspaces 18, which are filled with fire-proof lightweight concrete, are limited by a separating layer 7', about which three further outer layers 19 are placed. The blocks 17, which are produced from suitable high-temperature steel sections, are subsequently placed on the outermost layer 16, to which they are attached or bolted. With this construction of the wall, the layers 16 are made of steel having good high-temperature characteristics if correspondingly high operating temperatures prevail within the pressure tank. Ducts or channels, not shown, provide a connection between the outer air and the intermediate layer 8' if the tank is used for a process with which a gas, for example free hydrogen, which is to be diffused through, is liberated.

Figure 3:
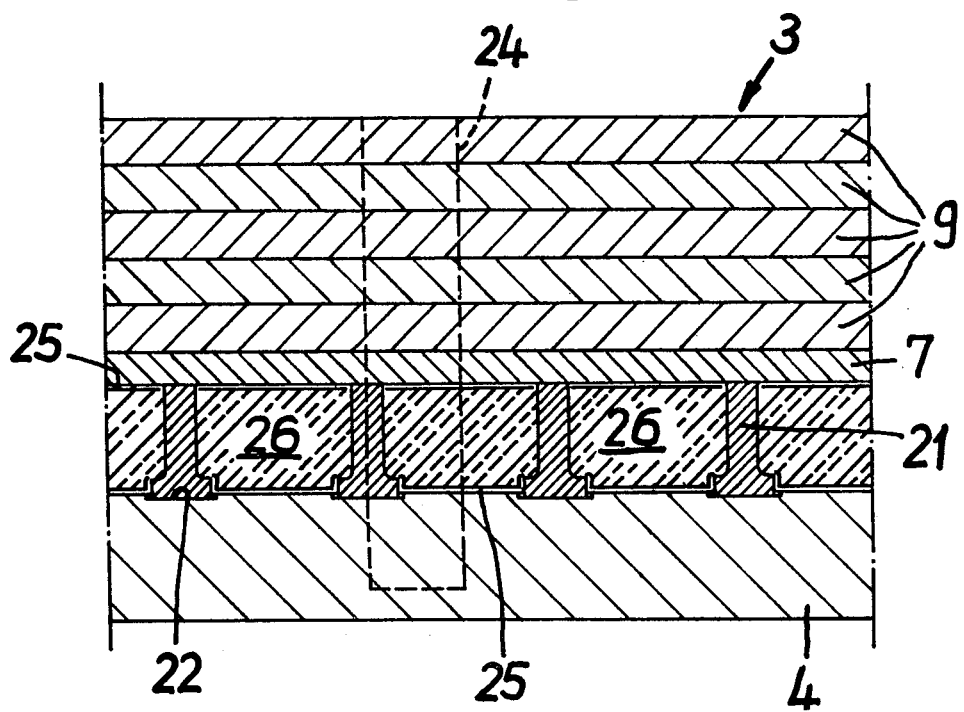

The embodiment of FIG. 3 shows a section through a tank wall of a hydrogenation reactor which is designed for an operating temperature of 500° C. and a pressure of 325 bar, and corresponds basically in construction to the tank of FIG. 1. Interspaces 26 adjoin the outer side of the inner layer 4, which comprises pressure hydrogen resistant chrome-molybdenum-steel. The interspaces 26 are formed in such a way that webs or crosspieces 21 which have a T-shaped cross section and comprise very high temperature ferritic steel abut the inner layer 4 in such a way that their respective flanges are flushly placed in a flat groove 22 of the inner layer 4. The webs 21 have breaks or openings (not shown) which are distributed approximately uniformly over the periphery of the tank. The breaks of adjacent webs are staggered relative to one another. The interspaces 26 are filled with thermally insulating solid medium; in this embodiment, rock wool is used for this purpose.

The sealed separating layer 7 of high-temperature steel adjoins the interspaces 26 and the webs 21, and simultaneously serves as a backing strip. A special perforated intermediate layer, which collects process gases which may diffuse through the inner layer 4, is not necessary since degasification channels (not shown) extend from the outside up to the interspaces 26 and carry off these gases toward the outside.

Outwardly supporting layers 9, each of which has substantially the same thickness, are connected to the separating layer 7. These layers 9 comprise standard fine-grained structural steel. Thermocouple elements which are insertable in an opening 24 of the wall serve as devices for measuring the temperature of the inner layer 4 in the region of its inner wall.

The rock wool is used in commercial-size sheets, the upper and lower sides of which are respectively provided with aluminum foil. The sheets are cut into strips having the width of the interspaces 26. The aluminum foil sheets 25 facilitate assembling and remain in the interspaces 26. The respective aluminum foil sheets 25 essentially lie close against the layers 4 and 7.

The positioning and construction of the webs or crosspieces, which can also extend in the longitudinal direction of the tank, are respectively determined by the simple structural formation of the tank and by the required ruggedness.

the present invention is, of course, in no way restricted to the specific disclosure of the specification and drawings, but also encompasses any modifications within the scope of the appended claims.

What we claim is:

1. In a pressure tank suitable for exothermic processes carried out in a range of between about 400° and about 500° C. for hydrogenation processes, a tank wall comprising in combination:
    an inner layer of chrome-molybdenum steel having an inner surface facing the process and an outer surface with flat grooves therein;
    a layer of thermal insulation comprising rock wool sandwiched between first and second sheets of aluminum foil, the first sheet of which is disposed in abutment with the outer surface of the layer of chrome-molybdenum steel;
    a plurality of steel webs disposed in spaced relation around the wall, each web having a base portion and rib portion with an exposed end and being T-shaped in cross-section, the webs extending through the layer of thermal insulation and sheets of aluminum foil with the bases seated in the grooves in the outer surface of the layer of chrome-molybdenum steel;
    a layer of high temperature-resistant steel in abutment with the second layer of aluminum foil and the exposed ends of the ribs, the layer of high temperature-resistant steel being substantially thinner than the inner chrome-molybdenum steel layer, and
    a plurality of reinforcing layers of fine-grained structural steel surrounding the high temperature steel layer.

2. The tank wall of claim 1 wherein the webs are discontinuous to allow degasification of gas which passes through the inner layer into the thermal insulation layer.

3. The tank wall of claim 2 further comprising at least one opening through all the layers and into the inner layer for receiving a thermal couple therein.

* * * * *